(12) United States Patent
Jones et al.

(10) Patent No.: US 10,410,171 B2
(45) Date of Patent: Sep. 10, 2019

(54) SYSTEM AND METHOD FOR INVENTORY MANAGEMENT

(71) Applicant: Walmart Apollo, LLC, Bentonville, AR (US)

(72) Inventors: Nicholaus Adam Jones, Fayetteville, AR (US); Matthew Allen Jones, Bentonville, AR (US); Robert James Taylor, Rogers, AR (US); Aaron James Vasgaard, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 182 days.

(21) Appl. No.: 15/157,837

(22) Filed: May 18, 2016

(65) Prior Publication Data
US 2016/0350708 A1 Dec. 1, 2016

Related U.S. Application Data

(60) Provisional application No. 62/167,363, filed on May 28, 2015, provisional application No. 62/167,370, filed on May 28, 2015.

(51) Int. Cl.
*G06Q 10/08* (2012.01)
*G06Q 30/02* (2012.01)

(52) U.S. Cl.
CPC ....... *G06Q 10/087* (2013.01); *G06Q 30/0223* (2013.01)

(58) Field of Classification Search
CPC .................................................... G06G 30/02

(Continued)

(56) References Cited

U.S. PATENT DOCUMENTS

| 5,918,211 A | 6/1999 | Sloane |
| 6,018,397 A | 1/2000 | Cloutier et al. |

(Continued)

FOREIGN PATENT DOCUMENTS

| AU | 1142402 A1 | 4/2002 |
| AU | 2002364902 A1 | 5/2004 |

(Continued)

OTHER PUBLICATIONS

Higuera de Frutos, S: Using smartphones as a very low cost tool for road inventories, Transportation Research Part C: Emerging technologies, Jan. 2014. Available at: https://www.sciencedirect.com/science/article/pii/S0968090X13002404?via%3Dihub (Year: 2014).*

(Continued)

*Primary Examiner* — Katherine Kolosowski-Gager
(74) *Attorney, Agent, or Firm* — Schmeiser, Olsen & Watts LLP; Karen E. Jachimowicz

(57) ABSTRACT

Disclosed is a system and method for using photos of the interior of a retail store to update an inventory database. The inventory management system receives a data capture from a mobile computing device carried by a customer of a retail store. The system sends a data capture request to the mobile computing device, which can include a request for a photo capture. The customer captures an image using the mobile computing device, and sends it to the inventory management system. The inventory management system analyzes the photo, and gleans from the photo inventory information such as products that are in stock, products that are out of stock, where products are located, etc. Photo inventory information obtained from the photo is used to update the inventory database. Each item of inventory data obtained from a photo relieves an employee of the responsibility of obtaining the inventory data.

8 Claims, 7 Drawing Sheets

(58) Field of Classification Search
USPC .................................................. 705/14.24
See application file for complete search history.

(56) References Cited

U.S. PATENT DOCUMENTS

| | | | |
|---|---|---|---|
| 6,601,759 | B2 | 8/2003 | Fife et al. |
| 6,606,411 | B1 | 8/2003 | Loui et al. |
| 6,745,186 | B1 | 6/2004 | Testa et al. |
| 6,810,149 | B1 | 10/2004 | Squilla et al. |
| 6,886,101 | B2 | 4/2005 | Glazer et al. |
| 6,937,989 | B2 | 8/2005 | McIntyre et al. |
| 7,177,820 | B2 | 2/2007 | McIntyre et al. |
| 7,222,363 | B2 | 5/2007 | Rice et al. |
| 7,431,208 | B2 | 10/2008 | Feldman et al. |
| 7,587,756 | B2 | 9/2009 | Peart et al. |
| 7,716,064 | B2 | 5/2010 | McIntyre et al. |
| 8,069,092 | B2 | 11/2011 | Bryant |
| 8,189,855 | B2 * | 5/2012 | Opalach ............ G06Q 10/087 382/100 |
| 8,321,795 | B2 | 11/2012 | Blanco et al. |
| 8,418,919 | B1 * | 4/2013 | Beyda ................ G07G 1/0054 235/375 |
| 8,429,004 | B2 * | 4/2013 | Hamilton ........... G06Q 10/0639 705/7.11 |
| 8,484,244 | B2 | 7/2013 | Gillet |
| 8,572,712 | B2 | 10/2013 | Rice et al. |
| 8,624,725 | B1 | 1/2014 | MacGregor |
| 8,644,610 | B1 | 2/2014 | Ramkumar et al. |
| 8,814,039 | B2 | 8/2014 | Bishop et al. |
| 8,820,633 | B2 | 9/2014 | Bishop et al. |
| 8,851,369 | B2 | 10/2014 | Bishop et al. |
| 2003/0046157 | A1 | 3/2003 | Prorock |
| 2003/0198390 | A1 | 10/2003 | Loui et al. |
| 2004/0139398 | A1 | 7/2004 | Testa et al. |
| 2006/0047577 | A1 | 3/2006 | Dietz et al. |
| 2007/0204044 | A1 | 8/2007 | Rice et al. |
| 2008/0215448 | A1 | 9/2008 | Boyle et al. |
| 2008/0215449 | A1 | 9/2008 | Boyle et al. |
| 2009/0184162 | A1 | 7/2009 | Rice et al. |
| 2009/0319352 | A1 | 12/2009 | Boyle et al. |
| 2009/0327087 | A1 | 12/2009 | Beck et al. |
| 2010/0142758 | A1 * | 6/2010 | Pinhas ............... H04N 1/00244 382/103 |
| 2010/0318412 | A1 | 12/2010 | Karypis et al. |
| 2011/0161154 | A1 | 6/2011 | McLaughlin et al. |
| 2011/0270652 | A1 | 11/2011 | McAleese et al. |
| 2012/0030227 | A1 | 2/2012 | Mital et al. |
| 2012/0158708 | A1 | 6/2012 | Gillet |
| 2012/0167182 | A1 | 6/2012 | Rice et al. |
| 2012/0265800 | A1 | 10/2012 | Tuchman et al. |
| 2013/0036043 | A1 | 2/2013 | Faith |
| 2013/0039543 | A1 * | 2/2013 | Fuhr ................... G06Q 10/087 382/103 |
| 2013/0138461 | A1 * | 5/2013 | Shahraray ............ G06Q 10/06 705/7.12 |
| 2013/0235206 | A1 * | 9/2013 | Smith .................... H04N 7/181 348/150 |
| 2013/0290089 | A1 | 10/2013 | Bousbib et al. |
| 2013/0329889 | A1 | 12/2013 | Griffith |
| 2014/0156461 | A1 | 6/2014 | Lemer |
| 2014/0195373 | A1 * | 7/2014 | Bassemir ........... G06Q 30/0639 705/26.8 |
| 2014/0214547 | A1 * | 7/2014 | Signorelli .......... G06Q 30/0267 705/14.64 |
| 2014/0278850 | A1 * | 9/2014 | Boccuzzi, Jr. ..... G06Q 30/0208 705/14.11 |
| 2014/0304123 | A1 * | 10/2014 | Schwartz ............ G06Q 10/087 705/28 |
| 2015/0032838 | A1 * | 1/2015 | Demsey ............. H04L 67/2842 709/213 |
| 2015/0134403 | A1 * | 5/2015 | Schwartz ............ G06Q 10/087 705/7.29 |
| 2015/0235157 | A1 * | 8/2015 | Avegliano ........ G06Q 10/06315 705/7.25 |
| 2015/0262116 | A1 * | 9/2015 | Katircioglu .......... G06Q 10/087 705/28 |
| 2015/0294333 | A1 * | 10/2015 | Avegliano ........ G06Q 10/06315 705/7.31 |
| 2016/0026032 | A1 * | 1/2016 | Moore ............... G06K 7/10316 382/103 |
| 2016/0224832 | A1 * | 8/2016 | Madey ............... G06K 9/00979 |
| 2016/0300235 | A1 | 10/2016 | Boyle et al. |
| 2016/0350708 | A1 * | 12/2016 | Jones .................. G06Q 10/087 |

FOREIGN PATENT DOCUMENTS

| | | | |
|---|---|---|---|
| AU | 2003272329 | | 6/2004 |
| EP | 1182859 | A2 | 2/2002 |
| EP | 1510944 | A1 | 3/2005 |
| EP | 2387772 | A1 | 11/2011 |
| EP | 2438562 | A1 | 4/2012 |
| EP | 2701099 | A1 | 2/2014 |
| JP | 2000112997 | | 4/2000 |
| JP | 2008282412 | A | 11/2008 |
| JP | 2014164481 | A | 9/2014 |
| WO | 2002029702 | | 4/2002 |
| WO | WO-02063542 | A2 * | 8/2002 ........... G06Q 10/087 |
| WO | 2004042614 | | 5/2004 |
| WO | 2004038997 | | 6/2004 |
| WO | 2005094407 | | 10/2005 |
| WO | 2006012538 | | 2/2006 |
| WO | 2010083113 | | 7/2010 |
| WO | 2011008625 | | 1/2011 |
| WO | 2013095333 | A1 | 6/2013 |
| WO | 2015008156 | A2 | 1/2015 |

OTHER PUBLICATIONS

Abbreviated Examination Report in counterpart United Kingdom Patent Application No. 1607650.7, dated Oct. 20, 2016; 6 pages.
Examination Report in UK Patent Application No. GB1607650.7, dated Nov. 7, 2017; 7 pages.
Examination Report in UK Patent Application No. GB1607651.5, dated Nov. 7, 2017; 6 pages.
Abbreviated Examination Report in counterpart United Kingdom Patent Application No. 1607651.5, dated Oct. 24, 2016; 6 pages.
Non-Final Office Action for U.S. Appl. No. 15/157,862, filed May 18, 2016, dated Feb. 15, 2018.
Office Action in Mexican patent application No. MX/a/2016/007036, dated Apr. 2, 2018.
Final Office Action in U.S. Appl. No. 15/157,862 dated May 31, 2018; 9 pages.
Non-Final Office Action in U.S. Appl. No. 15/157,862 dated May 30, 2019; 12 pages.

* cited by examiner

SYSTEM AND METHOD FOR INVENTORY MANAGEMENT

CROSS REFERENCE TO RELATED APPLICATION

This application claims priority to U.S. Provisional Patent Application Ser. No. 62/167,363 to Walmart Stores Inc., filed May 28, 2015 and entitled "System and Method For Inventory Management", which is hereby incorporated entirely herein by reference. This application also claims priority to U.S. Provisional Patent Application Ser. No. 62/167,370 to Walmart Stores Inc., filed May 28, 2015 and entitled "System and Method For Inventory Management", which is hereby incorporated entirely herein by reference.

FIELD OF THE INVENTION

The invention relates generally to inventory management of retail establishments, and specifically to a system and method of using photos of the interior of a retail store to obtain inventory data.

BACKGROUND

Within a retail store, much employee time and effort is often expended determining the relative location of products and their quantity. Some inventory data is captured automatically, such as the inventory information that is received as products are scanned for check out. However, most inventory information has to be obtained by having an employee visually inspecting available inventory and recording the results. Thus, retail store employees spend a considerable amount of time conducting physical inventories. It is desirable to be able to request, and receive, specific inventory information from a customer. Every piece of inventory information that can be obtained from a customer means an employee does not have to spend time gathering that piece of information. Customers are usually equipped with smart phones or other portable device capable of capturing photos while they shop. It is desirable to be able to request photos of the interior of the retail store from a customer, so that inventory information can be gleaned from the photos.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
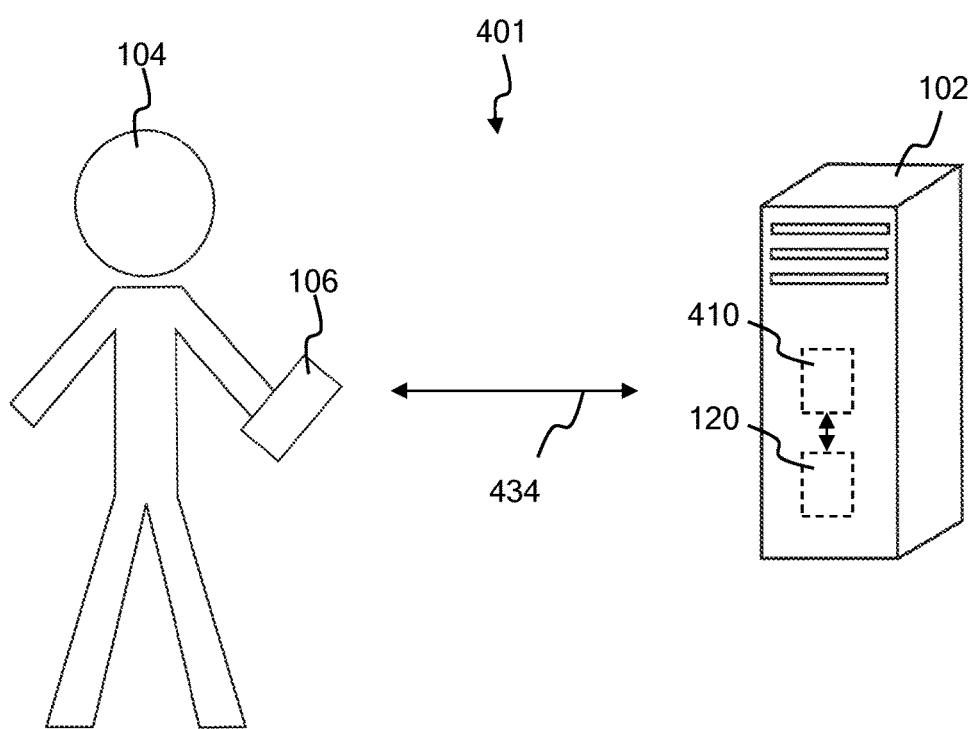
FIG. 1 is an illustrative view of an embodiment of an inventory management system for a retail store.

Disclosed herein is a system and method for managing inventory for a retail store or other similar establishment, including a method of using a photo of the inside of a retail store to update inventory data. The system includes a means to communicate with the mobile computing devices of customers. Customers often use their mobile computing devices, for example cellphones, tablets, or smartphones, to obtain data from store products, such as scanning a product barcode as they place the product in their shopping cart. These mobile computing devices are often capable of capturing photos. Photos of the interior of a retail store can be valuable resources for inventory data. When the system for managing inventory receives a data capture from the mobile computing device of a customer, a request for an informational data capture is formulated and sent to the mobile computing device. The informational data capture request can be or include a request for a photo capture. The request for informational data capture will be formulated based on the original data capture received, and the type of inventory information that may be needed to update the inventory database. The request for informational data capture can include a request for many different forms of data capture, such as an additional product barcode scan, a scan of a location identifier, a QR code scan, a scan of a store feature barcode, a photo capture, a near field communication (NFC) tag data capture, a Microsoft™ tag data capture, or any other type of informational data capture that can provide useful inventory information to the system for managing inventory. The inventory management system analyzes the photo or photos received, and extracts inventory information from the photo. The inventory management system uses the inventory information from the photo to update an inventory database. Inventory information obtained from a customer relieves employees from having to spend time and energy to gather the inventory information.

Inventory management is a perpetual task for establishments that sell products. It is a constant struggle to know what items exist in a store, which items are selling, which items are not selling, and where the items are. Automated checkout systems have helped by keeping track of items that are sold. However, store employees are still needed to gather missing inventory data by monitoring and recording the status of inventory on store shelves. Having store employees gather inventory data costs the retail establishment in employee salaries. Additionally, the employee is not available to perform tasks other than gathering inventory data. It is desirable to obtain as much inventory information as possible from customers. Customers are often more prevalent in stores than employees, and the store does not have to pay customers a salary for providing inventory data. Every bit of inventory data that can be obtained from a customer frees up an employee to complete a different task rather than gathering the inventory data.

Mobile computing devices such as tablets, cell phones, and portable scanners are often used by customers as they move about a store. Customers are often provided with mobile computing devices to use while they are in a store for the purpose of scanning products for information or remote check-out, for example. Retail stores also provide applications to reside on the personal mobile computing devices of customers for use in remote check out, obtaining coupons, or tracking products. These mobile computing devices are capable of, or already are, providing wireless data pertaining to what products are around them at any particular point in time. Thus, customers already interact wirelessly with one or more store servers using their portable scanners or tablets. The mobile computing devices carried by customers are often capable of capturing and transmitting photos of the interior of the store the customer is shopping in. Photos contain much information on the status of inventory in a store. Organizing the means to collect photos, scanned barcodes and other captured data from customers and employees as they move about the store, requesting specific data or image captures from customers, and using the specific data and image captures obtained from customers can result in an enhanced understanding of the inventory status of a retail store. The disclosed system and method of inventory management collects data captures from mobile computing devices, sends requests for additional image and data captures in response to receiving an initial data capture, and collects and analyzes the customer response. The customer responses are used to obtain inventory data and to update the inventory database.

FIG. 1 illustrates a system 401 for managing inventory of a retail store. System 401 is an inventory management system of a retail store, and a system that gathers inventory data from photos. System 401 in this embodiment includes a server 102 that includes an inventory management system 410, and an inventory database 120. System 410 is an inventory management system of a retail store, and a system that gathers inventory data from photos. System 401 in this embodiment also includes a mobile computing device 106 that is carried by a customer 104. Server 102 receives communication 434 from mobile computing device 106. Customer 104 can be any customer or other individual within or around the retail store.

Server 102 in the embodiment shown in FIG. 1 is a retail store server resident in the retail store, but this is not meant to be limiting. Server 102 may be available via the internet, cloud computing services, or other local or remote server services. Server 102 can be any type of electronic or computing equipment capable of containing system 410 and inventory database 120.

In this embodiment, inventory management system 410 is a computer program, but it is to be understood that inventory management system 410 can take many forms and implementations, including hardware, software, or both. Inventory management system 410 is resident on server 102 in this embodiment, but it is to be understood that system 410 can be a part of any computational equipment. In a particular embodiment, system 410 is implemented in hardware processors. The hardware processors can be application specific integrated circuits (ASICs) or hardware accelerators, for example. The hardware processors can be part of one or more special purpose computers that execute computer program instructions which implement one or more functions and operations of inventory management system 410. In a specific embodiment, inventory management system 410 includes specialized hardware accelerator integrated circuits designed to perform specific inventory management tasks.

Inventory database 120 is any type of database useful for the purpose of storing inventory data. Database 120 can be electronic and/or computerized. In the embodiment shown in the figures, database 120 is a database stored on memory on server 102, in electrical communication with inventory management system 410. Inventory database 120 can be on paper or other storage medium.

Communication 434 in the embodiment shown in FIG. 1 is wireless communication 434 between mobile computing device 106 and inventory management system 410 of server 102, but this is not meant to be limiting. Wireless communication 434 can be a Bluetooth communication, a wireless local area network communication, wireless cellular telephone communication, or any other form or type of wireless communication. In some embodiments, communication 434 is wired or optical communication. Communication 434 can be implemented by any type of transmitter/receiver elements known in the art now or in the future for data transfer between a mobile computing device and an electronic or computer system.

Figure 2:
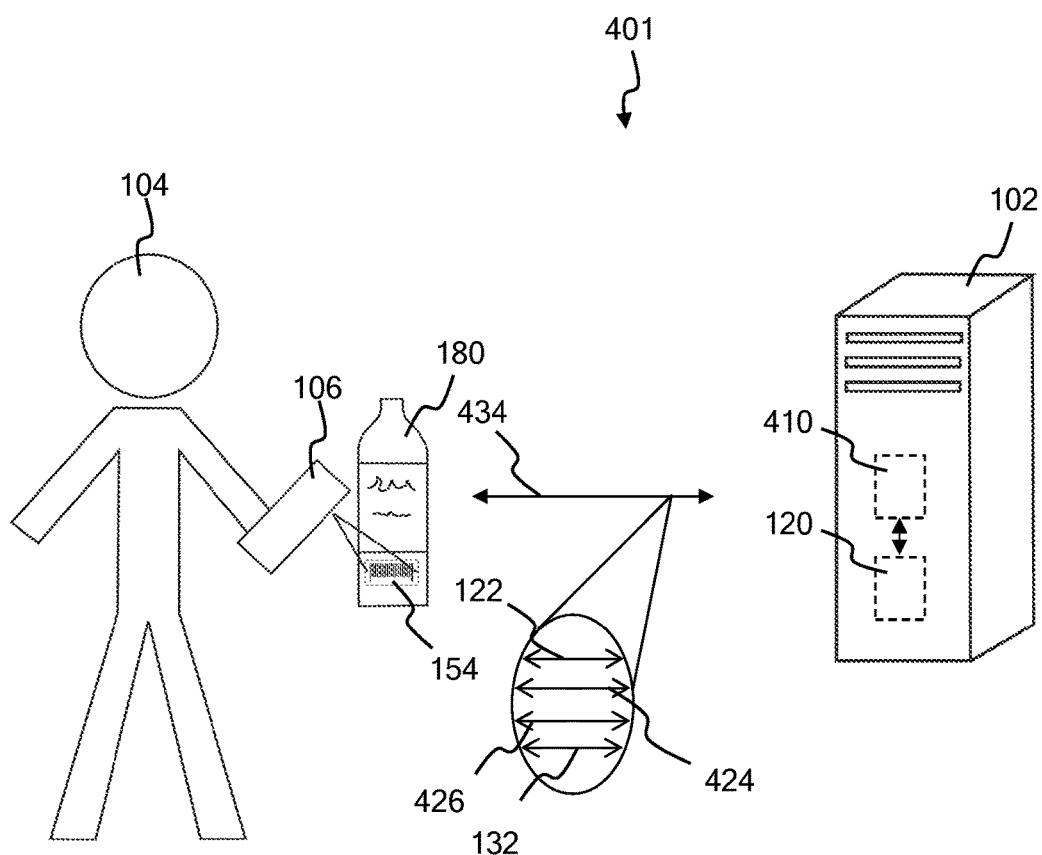
FIG. 2 illustrates an embodiment of an inventory management system gathering a product barcode scan from a customer.
Figure 3:
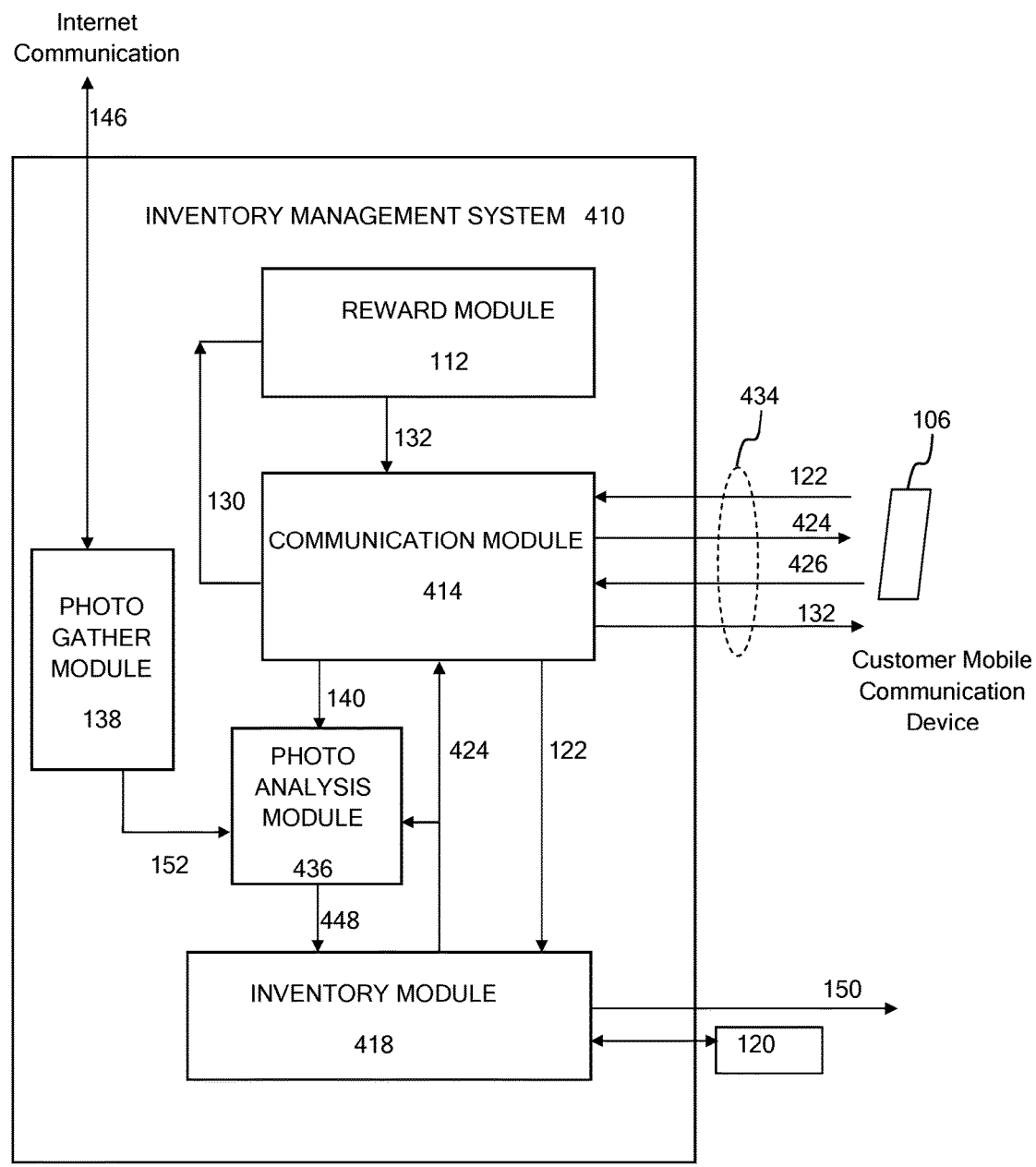
FIG. 3 illustrates a block diagram of an embodiment of an inventory management system.

Communication 434 can include many different types of communication between mobile computing device 106 and server 102. FIG. 2 shows system 401 for managing inventory, with customer 104 scanning a barcode 154 of a product 180 and interfacing with inventory management system 410 via communication 434. FIG. 3 shows a block diagram of an embodiment of inventory management system 410 of FIG. 1 and FIG. 2. In this embodiment, communication 434 includes a data capture 122, an informational data capture request 424, a customer response 426 to the informational data capture request 424, and a reward 132, as shown in FIG. 2 and FIG. 3. In some embodiments, communication 434 includes additional types of communication between mobile computing device 106 and inventory management system 410. The different elements of communication 434 are discussed in more detail below.

Data capture 122 can be any type of data captured by mobile computing device 106 and provided to inventory management system 410. Customer 104 can capture many different types of data in a retail store using mobile computing device 106. Mobile computing device 106 can be used to scan product barcodes, quick response (QR) codes, or Microsoft™ Tags as customer 104 is putting a product in their cart to purchase the product, for example. Customer 104 can capture data from NFC tags to obtain information on a product or a location, for example. Customer 104 can scan a location barcode to determine information about where they are in the retail store or where certain products are located. In some embodiments, customer 104 will enter data manually into mobile computing device 106, such as entering a barcode number manually when the barcode has been damaged. Customer 104 can use a camera or mobile computing device 106 to capture an image of a barcode, a QR code, a product, or a location in the store. Any of these data captures can be included in data capture 122. For example, data capture 122 can be an image or photo captured by customer 104 of a product and/or a store feature. If customer 104 wishes to obtain information about a product, they can send data capture 122 that includes an image or photo of the product, or the store shelf with the product, to computer system 410. Customer 104 can be provided with a video, recipe, or other information about the product in response.

Each time mobile computing device 106 captures data from a store product, location, or other apparatus, mobile computing device 106 sends this data to system 410 of server 102 as data capture 122. In some embodiments, data capture 122 is a product barcode scan. In some embodiments, data capture 122 is a QR code scan. In some embodiments, data capture 122 is a Microsoft™ Tag scan. In some embodiments, data capture 122 is a data capture from a near field communication (NFC) tag. An NFC tag can be any type of tag that can receive or provide data to a nearby mobile computing device. In some embodiments, data capture 122 is an image capture (photo). In some embodiments, data capture 122 can be a different type of data capture from a store product or device. Thus, data capture 122 can be any type of communication where data is captured by mobile computing device 106 from a product, location, device, structure, or other apparatus in the retail store, and the information is transmitted to system 410.

Mobile computing device 106 can be one of many different types of devices suited for customer 104 to communicate with server 102 and inventory management system 410. In this embodiment, mobile computing device 106 is a smartphone device, but this is not meant to be limiting. Mobile computing device 106 can be a mobile phone, a tablet, a handheld computer, a portable scanner, or any other mobile computing device with the ability to capture images or data from barcodes or other data devices in a retail store, and communicate with server 102 and/or inventory management system 410.

Mobile computing device 106 is carried by customer 104 while shopping in or around the retail store. Communication 434 between mobile computing device 106 and system 410 is initiated by mobile computing device 106 capturing data in the retail store, and transmitting this data capture 122 to system 410. For example, mobile computing device 106 can be used by customer 104 to scan a product barcode 154 on a product 180, as shown in FIG. 2. In this example, mobile computing device 106 sends data capture 122 to inventory management system 410, as shown in FIG. 2 and FIG. 3, where data capture 122 is a barcode scan of barcode 154 on product 180.

Mobile computing device 106 can be used by customer 104 to scan barcode 154 as shown in FIG. 2 for many different reasons. For example, customer 104 can scan product barcode 154 as they put product 180 with barcode 154 in their cart. In this example, mobile computing device 106 can keep track of the products and the total cost of the products in the shopping cart of customer 104. In some embodiments, mobile computing device 106 can execute remote checkout of customer 104. In another example, customer 104 may scan product barcode 154 to get information or a price of product 180 with barcode 154. Customer 104 has many different reasons for scanning barcode 154 with mobile computing device 106. Inventory management system 410 may or may not take note of why customer 104 scans barcode 154. Inventory management system 410 takes note that customer 104 has scanned barcode 154, and begins the process of obtaining additional inventory information from customer 104.

Inventory management system 410 includes a reward module 112, a communication module 414, a photo analysis module 436, a photo gather module 138, and an inventory module 418. A "module", as used in this document, can be a circuit, a software program, a hardware apparatus, an application specific integrated circuit, a special purpose computer, or a combination of hardware and software circuits, systems, or implementations. A module can be any element, thing, or program that accepts one or more input and provides one or more output. Inventory management system 410 in this embodiment is a computer implemented system, but this is not meant to be limiting. System 410 can be implemented in hardware, firmware, software, or any combination of these. In a particular embodiment, reward module 112, communication module 414, photo analysis module 436, photo gather module 138, and inventory module 418 are each implemented as an application specific integrated circuit that includes specialized hardware accelerator integrated circuits designed to perform specific inventory management tasks. In another specific embodiment, reward module 112, communication module 414, photo analysis module 436, photo gather module 138, and inventory module 418 are each implemented as a hardware processor. In some embodiments, each hardware processor is a hardware accelerator that interfaces with a computer program. In some embodiments, each hardware processor is a part of one or more special purpose computer that executes computer program instructions.

Communication module 414 accepts as input communication 434 from mobile computing device 106. Communication 434 includes data capture 122. Inventory module 418 is coupled to communication module 414, and receives data capture 122 from communication module 114. Inventory module 418 sends an informational data capture request 424 to communication module 414 in response to receiving data capture 122 from communication module 414. Inventory module 418 formulates informational data capture request 424 based on data capture 122. Inventory module 418 uses data capture 122 to determine what other products or apparatus may be around customer 104, and what inventory or location information would be helpful to inventory management system 410. Informational data capture request 424 is formulated to request an additional data capture from customer 104 that will provide useful inventory information to inventory management system 110.

In the embodiment shown in FIG. 2, data capture 122 is a barcode scan of barcode 154 of product 180. Informational data capture request 424 in this embodiment is a request for an image capture (photo) of the store shelves that hold product 180. Informational data capture request 424 in this embodiment is a photo capture request.

Communication module 414 transmits informational data capture request 424 to mobile computing device 106, and waits for a customer response 426. Customer response 426 can take a number of forms, including a null response, the requested informational data capture, or a response that informational data capture request 424 cannot be fulfilled. Customer response 426 is a null response if no further data is received from mobile computing device 106. In other words, a null response is when customer 104 does not respond to informational data capture request 424. Communication module 414 will consider customer response 426 to be a null response after a predetermined period of time passes without receiving customer response 426.

Figure 4:
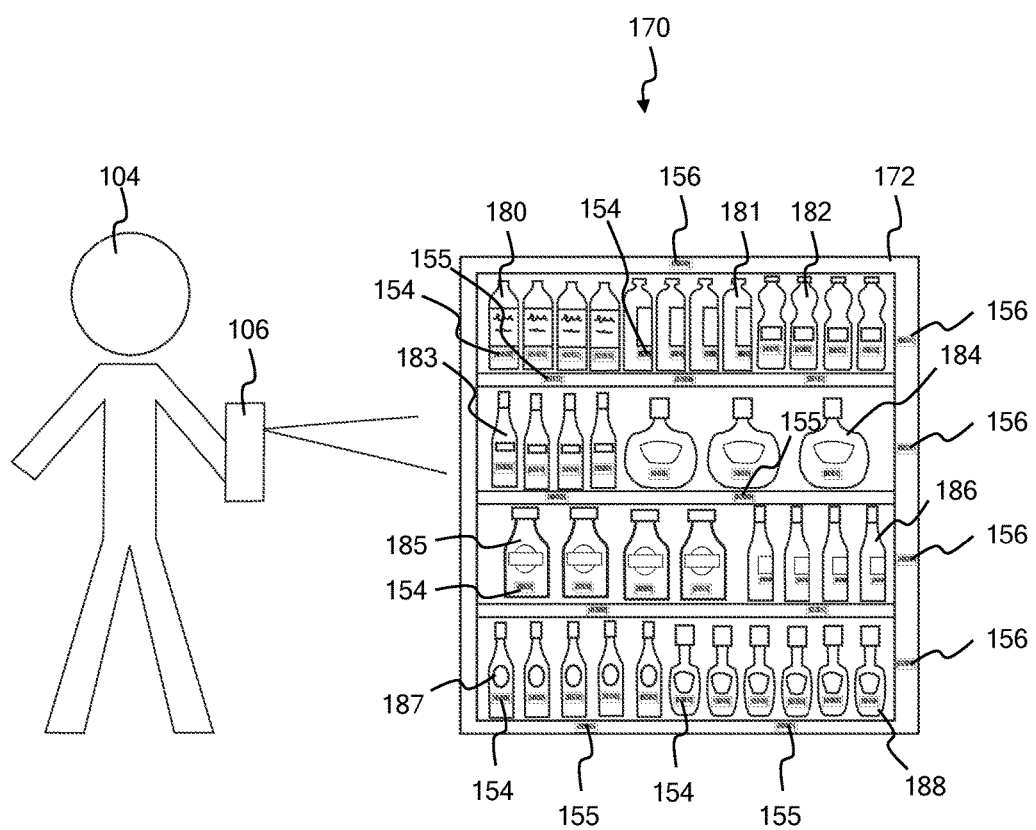
FIG. 4 illustrates an embodiment of a mobile computing device of a customer capturing a photo of an interior of a retail store.

Customer response 426 can include a photo 140. A photo is also called an image capture, and is the image data output from a digital camera when a photo is taken. Customer response 426 will include photo 140 when customer 104 responds to informational data capture request 424 by capturing the requested photo 140. FIG. 4 illustrates customer 104 capturing a photo 140 of an interior 170 of a retail store with mobile computing device 106. In this embodiment, mobile computing device 106 is capturing photo 140 of shelves 172 that hold product 180, as requested in the example informational data capture request 424 as described above in connection with FIG. 2 and FIG. 3. Note that in some embodiments, a photo 140 is received as data capture 122. In this embodiment, informational data capture request 124 may include a request for an additional photo 140.

Figure 5:
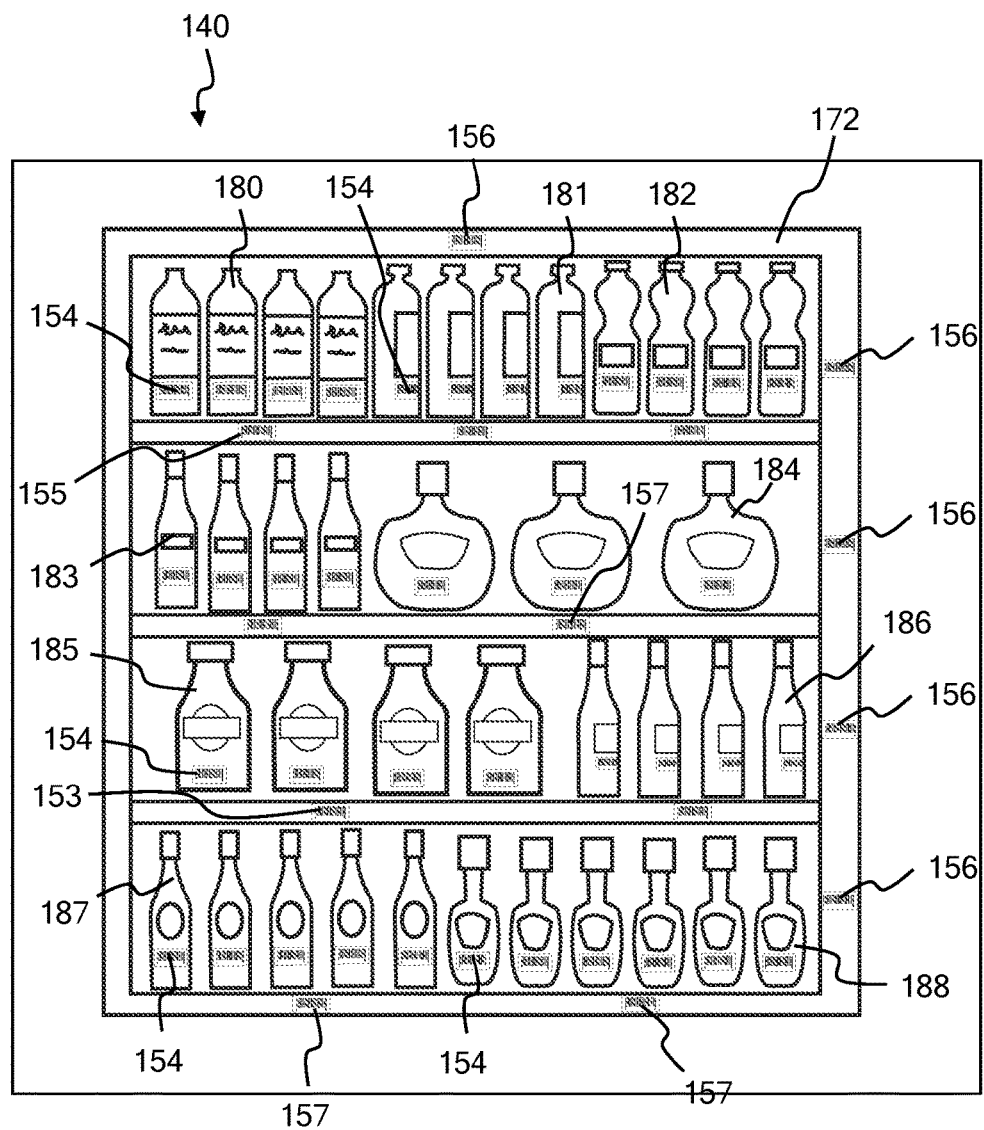
FIG. 5 is a pictorial representation of a photo of an interior of a retail store.

In the example embodiment shown in FIG. 2, FIG. 3, and FIG. 4, customer response 426 includes photo 140 as shown being captured in FIG. 4, and as shown as one possible example of photo 140 in FIG. 5, where photo 140 is a photo capture of the store shelves that contain product 180. Customer 104 received informational data capture request 424 with mobile computing device 106, where informational data capture request includes the request for a photo of the store shelves that hold product 180. Customer 104 captures photo 140 of the shelves containing product 180, as was requested in informational data capture request 424 and shown in FIG. 4 and FIG. 5. Mobile computing device 106 transmits customer response 426 to communication module 114, where customer response 426 is or includes photo 140. In this embodiment, communication module 114 is a means for collecting photos of the interior of a retail store. In this embodiment communication module 114 collects photo 140 from mobile computing device 106 of customer 104.

Referring back to FIG. 3, communication module 414 receives customer response 426 and determines, in this example, that customer response 426 comprises photo 140. Communication module 414 performs at least two actions in response to receiving customer response 426 that comprises photo 140. First of all, communication module 414 transmits photo 140 to photo analysis module 436 in response to communication module 414 receiving customer response 426 that comprises photo 140. And, communication module 414 transmits a reward request 130 to reward module 112.

Photo analysis module 436 is coupled to communication module 414, and receives photo 140 from communication module 414. Photo analysis module 436 receives photo 140 from communication module 414, and sends photo inventory information 448 to inventory module 418 in response. Photo analysis module 436 is designed and configured to recognize photo 140, analyze photo 140, and extract photo inventory information 448 from photo 140. Photo inventory information 448 can be any type of information that is useful to inventory module 418 and can be identified from photo 140, such as products that are recognizable in photo 140, where products are located, how many products are present, empty shelves where products should be, etc.

For example, photo 140 as shown in FIG. 5 is received from customer 104 in response to informational data capture request 424, as discussed above. Photo 140 includes much useful inventory information. Photo 140 shows products 180, 181, 182, 183, 184, 185, 186, 187, and 188 on shelves 172. Photo analysis module 436 will extract photo inventory information 448 that includes the identity of products 181, 182, 183, 184, 185, 186, 187, and 188, and that these products are in stock and on shelves 172.

Photo 140 also includes a location identifier barcode 156. If location identifier barcode 156 is readable in photo 140, the information in location identifier barcode 156 can be included in photo inventory data 448. Photo analysis module 436 will identify the location indicated by location identifier barcode 156 and insert this information in photo inventory data 448. For example, location identifier barcode 156 in this embodiment identifies shelves 172, but this is not meant to be limiting. Location identifier barcode 156 can identify an aisle, a section, or a location category of the retail store. In some embodiments, photo analysis module 436 can identify a location in photo 140 by recognizing features other than location barcodes 156, such as aisle signs or other identifying features in photo 140. Photo analysis module 436 can determine a location in photo 140 by identifying a product or a number of products on a shelf or other store feature, and determining the location from the products identified.

Photo 140 also includes a number of product barcodes 154. For each product barcode 154 that is readable in photo 140, photo inventory information 448 will identify the product, and include this information in photo inventory information 448. Product barcodes can be QR codes or other types of data.

Figure 6:
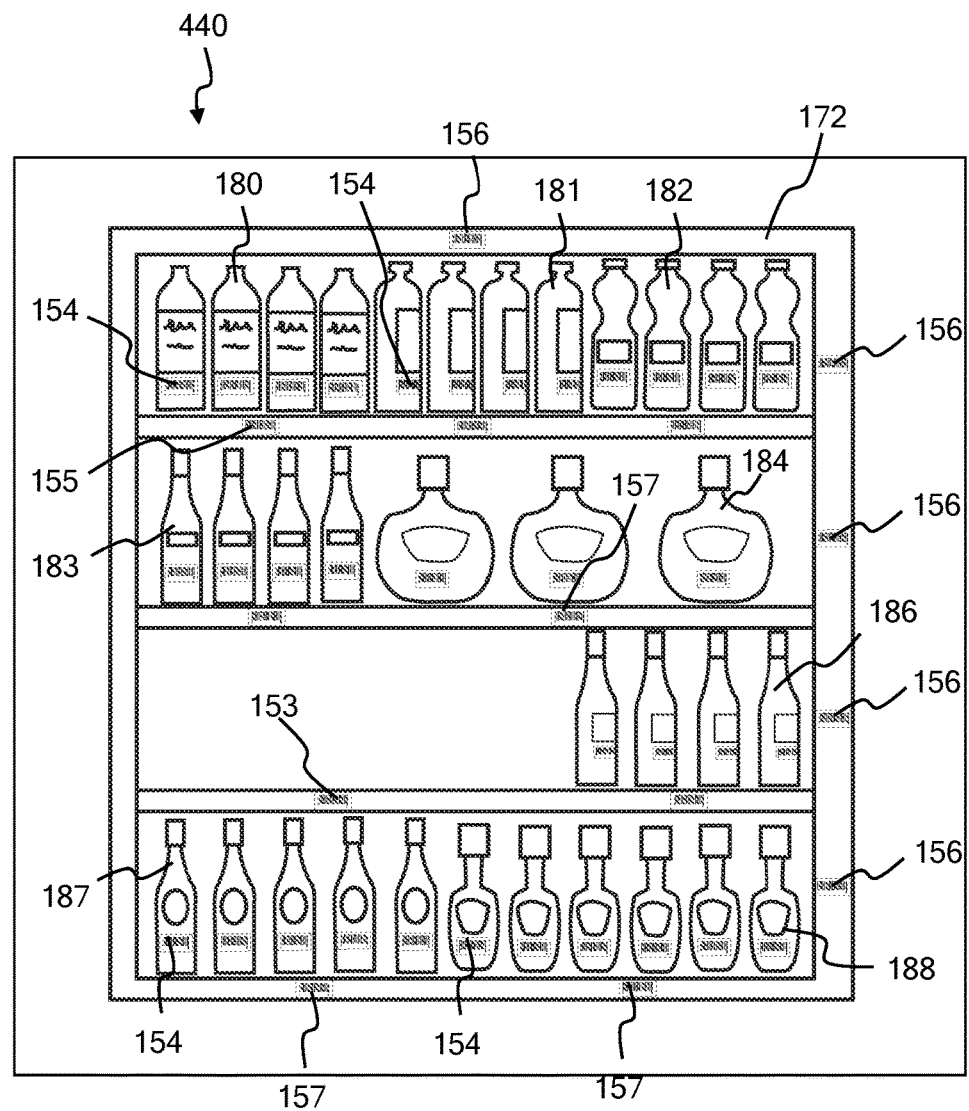
FIG. 6 is a pictorial representation of a photo of an interior of a retail store.

Photo 140 also includes a number of product location barcodes 153 and 155. For each of the product location barcodes 153 and 155 that are readable, this data will be included in photo inventory information 448. For example, photo 140 as shown in FIG. 5 shows that product 185 is in stock above product location barcode 153. If a photo 440 as shown in FIG. 6 is received by photo analysis module 436 instead of photo 140, photo analysis module 436 will identify a missing product. Photo analysis module 436 will identify that product location identifier 153 identifies a product that is not on shelves 172. The missing product information will be sent with photo inventory information 448 to inventory module 418.

It should be evident that photo analysis module 436 can obtain a large amount of photo inventory information 448 from any particular photo 140 or 440, limited only by the amount of the interior 170 of the retail store that is visible in photo 140 or 440, and the information extraction and analysis capabilities of photo analysis module 436.

Inventory module 418 is coupled to photo analysis module 436, and receives photo inventory information 448 from photo analysis module 418. Inventory module 418 uses photo inventory information 448 to update inventory database 120. There are many different actions that inventory module 418 can take in response to receiving photo inventory information 448. Inventory module 418 will save photo inventory information 448, and analyze and take appropriate inventory actions according to the information received in photo inventory information 448. It is to be understood that photo inventory information 448 can take many different forms. Photo inventory information 448 can take different forms depending on the specific informational data capture request 424 that was transmitted, and the quality and quantity of information that can be gleaned from photo 140.

Updating inventory database 120 can take many forms, depending on the information received in photo 140 and photo inventory information 448. In some embodiments, updating inventory database 120 in response to receiving photo 140 from customer 104 includes flagging a product as being on feature in response to receiving a photo 140 that shows the product on feature. In some embodiments, updating inventory database 120 in response to receiving photo 140 from customer 104 includes flagging multiple products as being on feature.

In some embodiments, updating inventory database 120 in response to receiving photo 140 from customer 104 includes flagging a product as mis-placed. For example, inventory module 418 determines, in a particular example, that product 184 as shown in photo 140 is mis-placed. Inventory module 418 can either change the location of product 184 in database 120, or output an inventory action request 150 to have product 184 moved on the store shelves to its proper location. Inventory action request 150 can be a request for any type of inventory action by an individual, including moving products, re-stocking shelves, replacing old products with new, etc.

In some embodiments, updating inventory database 120 in response to receiving photo 140 from customer 104 includes flagging a product as in stock. In some embodiments, updating inventory database 120 in response to receiving photo 140 from customer 104 includes flagging a product as being out of stock.

In some embodiments, inventory module 118 checks one or more products against a planogram in response to receiving photo 140. Inventory module 418 can check any or all of products 180, 181, 182, 183, 184, 185, 186, 187, or 188 of photo 140 against a planogram and determine if all are in their right location. In some embodiments, inventory module 418 verifies the street date of a product in response to receiving photo 140. In some embodiments, inventory module 418 checks whether a product location barcode 155 matches a product location indicator in response to receiving photo 140. In some embodiments, inventory module 418 updates a product location indicator in response to determining from photo 140 that a product location indicator does not match the product location barcode 155 for that product in inventory. In some embodiments, inventory module 118 generates an inventory action request 150 to move a product to a new product location in response to determining from photo 140 that a product location indicator does not match the product location barcode 155 for that product. Updating inventory database 120 can take these or many other forms, depending on the particular inventory information received from photo 140 of customer response 426.

As can be understood from the above examples, informational data capture request 424 and customer response 426 with photo 140 can take many forms, depending on the type of inventory information determined to be needed by inventory module 418, and the ability of customer 104 to supply inventory information using mobile computing device 106. Inventory management system 410 is designed to gather as much inventory information as possible from customer 104 and photos 140, which maximizes the accuracy of inventory database 120 and minimizes the amount of employee time and effort spent on gathering inventory data.

Inventory management system 410 in the embodiment shown in FIG. 3 also includes photo gather module 138. Photo gather module 138 is coupled to photo analysis module 436, and internet 146. Photo gather module 138 is configured to find photos 152 of the interior 170 of the retail store from internet 146, and use the photos 152 from the internet the same as photos 140 captured by customer 104. If photo gather module 138 can find photos 152 that it can identify as the interior 170 of the retail store, and can identify the time they were taken, these photos 152 can be analyzed and used just as if the photos 152 were captured by a customer, as described above. In some embodiments, photo gather module 138 is coupled to other possible sources of photos 152, such as security cameras, for example. Inventory management system 410 is designed to glean and use information from any number of sources to obtain inventory data.

When communication module 414 receives data capture 122 or customer response 426 from mobile computing device 106 that includes photo 140, communication module 414 transmits a reward request 130 to reward module 112. Providing customer 104 with a reward for providing photo 140 incentivizes customer 104 to participate in gathering inventory data. Reward module 112 is coupled to communication module 414 and receives reward request 130. Reward module 112 transmits a customer reward 132 to communication module 414 in response to receiving reward request 130.

Reward 132 can take many forms. Reward 132 can be a coupon, a product information guide, a website, a recipe, a video, for example, but not by way of limitation. In some embodiments, customer 104 gets a choice of what reward they would like. In some embodiments, reward 132 is related to data capture 122 initially provided by customer 104 via mobile computing device 106. For example, when mobile computing device 106 sends barcode scan of barcode 154 on product 180, customer reward 132 might be a recipe that uses product 180. Or reward 132 might be a coupon for product 180, or an information guide on product 180. By way of another example, customer 104 may send a photo 140 of a motor oil product. Reward 132 could be a video of how to change the oil in a car. Customer reward 132 can be any type of reward that works to obtain inventory information from customer 104 and mobile computing device 106.

Reward module 112 sends customer reward 132 to communication module 114. Communication module 114 transmits customer reward 132 to mobile computing device 106 of customer 104 for customer 104's use. Inventory management system 410 then waits for another data capture 122 to arrive, and the inventory data gathering process begins again.

Figure 7:
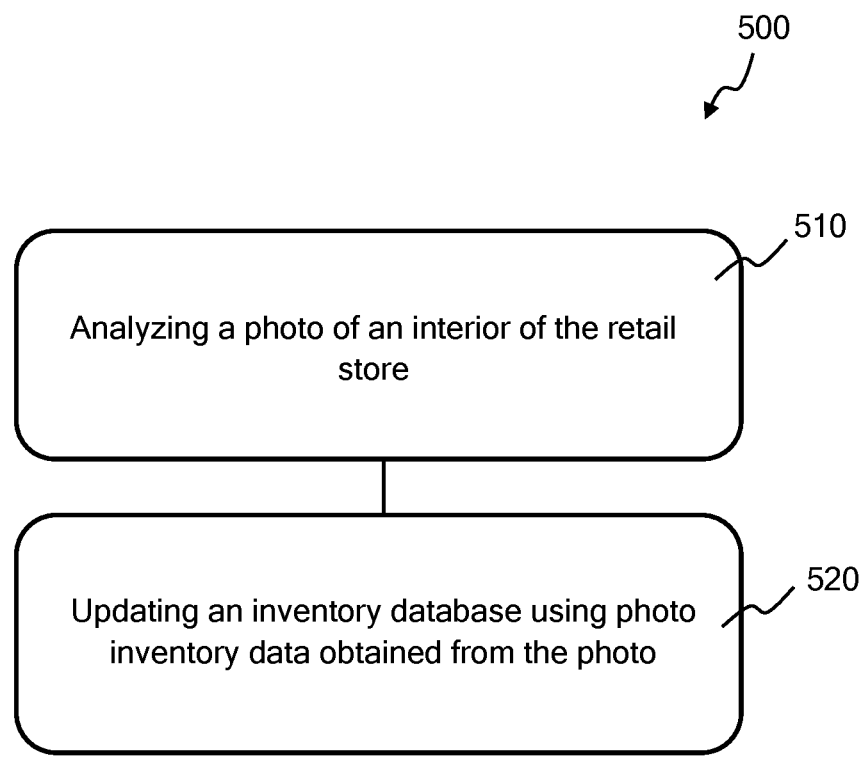
FIG. 7 illustrates a method of using a photo of the inside of a retail store to update inventory data.

FIG. 7 illustrates a method 500 of using a photo of the inside of a retail store to update inventory data. Method 500 of using a photo of the inside of a retail store to update inventory data includes element 510 of analyzing a photo of an interior of the retail store. Method 500 also includes element 520 of updating an inventory database using photo inventory data obtained from the photo. Method 500 of using a photo of the inside of a retail store to update inventory data can include many other elements. In some embodiments, method 500 of using a photo of the inside of a retail store to update inventory data includes obtaining a photo of an interior of the retail store from a customer of the retail store. In some embodiments, method 500 of using a photo of the inside of a retail store to update inventory data includes obtaining a photo of an interior of the retail store from the internet. In some embodiments, method 500 of using a photo of the inside of a retail store to update inventory data includes sending a photo capture request to a mobile computing device of a customer in response to the customer scanning a barcode of a product in the retail store. In some embodiments, method 500 of using a photo of the inside of a retail store to update inventory data includes delivering a reward to the customer for capturing the photo of the interior of the retail store. In some embodiments, method 500 of using a photo of the inside of a retail store to update inventory data includes sending a request to the customer for a second photo capture in response to receiving the photo from the customer.

Step 510 of analyzing a photo of an interior of a retail store can include many elements. In some embodiments, step 510 includes identifying a product in the photo. In some embodiments, step 510 includes identifying a product location in the photo. In some embodiments, step 510 includes identifying a missing product from the photo. In some embodiments, step 510 includes identifying one of an aisle, a section, or a category of the retail store in a photo. In some embodiments, step 510 includes identifying one or more product barcode in a photo. In some embodiments, step 510 includes identifying a QR code in a photo.

Step 520 of updating an inventory database using photo inventory data obtained from the photo can contain many additional elements. In some embodiments, updating an inventory database includes flagging a product as being on feature in response to receiving the photo. In some embodiments, updating an inventory database includes flagging a product as out of stock in response to receiving the photo. In some embodiments, updating an inventory database includes flagging a product as mis-placed in response to receiving the photo. In some embodiments, updating an inventory database includes flagging a product as in stock. In some embodiments, updating an inventory database includes checking one or more items against a planogram. In some embodiments, updating an inventory database includes verifying the street date of a product. In some embodiments, updating an inventory database includes checking whether a product location barcode matches a product location indicator. In some embodiments, updating an inventory database includes updating a product location indicator in response to determining from the photo that the product location indicator does not match the product location barcode. In some embodiments, updating an inventory database includes generating an inventory action request to move a product to a new product shelf location in response to determining from the photo that the product location indicator does not match the product location barcode.

Disclosed is a system and method for using photos of the interior of a retail store to update an inventory data base. The system receives a data capture from a mobile computing device carried by a customer of a retail store. The system sends an informational data capture request to the mobile computing device, which can include a request for a photo capture. The customer captures an image using the mobile computing device, and sends it to the system for inventory management described herein. The inventory management system analyzes the photo and gleans from the photo inventory information such as products that are in stock, products that are out of stock, where products are located, etc. Photo inventory information obtained from the photo is used to update the inventory database. Photos can contain much inventory information, and each item of inventory data obtained from a photo relieves an employee of the responsibility to obtain that piece of inventory data. The employee is able to do other work, and the retail store is able to save the cost of having employees gather inventory data.

As will be appreciated by one skilled in the art, aspects of the disclosed inventory management system in a retail store may be embodied as an electronic system, a method, or a computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing.

Computer program code for carrying out operations for aspects of the present invention may be written in any combination of one or more programming languages, including an object oriented programming language or conventional procedural programming languages, such as the "C" programming language or similar programming languages. The program code may execute entirely on the retail store's computer, partly on the store's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or hardware accelerators or application specific integrated circuits.

While the invention has been shown and described with reference to specific preferred embodiments, it should be understood by those skilled in the art that various changes in form and detail may be made therein without departing from the spirit and scope of the invention as defined by the following claims.

What is claimed is:

1. An inventory management system of a retail store, the inventory management system comprising:
   a mobile computing device of a customer of the retail store, wherein the mobile computing device captures at least one data capture;
   a communication module of a special purpose computer, wherein the communications module communicates with the mobile computing device of the customer of the retail store, wherein the communication module receives the at least one data capture from the mobile computing device;
   an inventory module of the special purpose computer coupled to the communication module, wherein the inventory module sends an informational data capture request for additional information including an image capture to the communication module in response to receiving the at least one data capture from the communication module;
   a photo gather module of the special purpose computer, wherein the photo gather module gathers a photo of an interior of the retail store having an identifiable time taken from the mobile computing device;
   a photo analysis module of the special purpose computer, wherein the photo gather module delivers the photo of the interior of the retail store having the identifiable time taken to the photo analysis module, wherein the communication module transmits the informational data capture request to the mobile computing device in response to receiving the informational data capture request from the inventory module; and a reward module, wherein the reward module assigns a reward to the customer in response to the communication module receiving the photo of the interior of the retail store from the mobile computing device.

2. The inventory management system of claim 1, wherein the photo analysis module is coupled to the communication module and the inventory module, wherein the photo analysis module sends photo inventory data to the inventory module in response to receiving the photo of the interior of the retail store from the photo gather module.

3. The inventory management system of claim 2, wherein the inventory module updates an inventory database in response to receiving the photo inventory data from the photo analysis module.

4. The inventory management system of claim 1, wherein the informational data capture request is a photo capture request.

5. The inventory management system of claim 1, wherein the data capture is a scan of a barcode of a product in the retail store.

6. The inventory management system of claim 2, wherein the photo analysis module sends photo inventory data to the inventory module in response to identifying a missing product in the photo of the interior of the retail store.

7. The inventory management system of claim 3, wherein the inventory module flags a product as a feature item in the inventory database in response to receiving the photo inventory data from the photo analysis module.

8. The inventory management system of claim 3, wherein the inventory module flags a product as missing in the inventory database in response to receiving the photo inventory data from the photo analysis module.

\* \* \* \* \*